United States Patent

[11] 3,537,580

[72] Inventors John E. Beroset
Oley;
Donald M. Large, Temple, Pennsylvania
[21] Appl. No. 763,860
[22] Filed Sept. 30, 1968
[45] Patented Nov. 3, 1970
[73] Assignee Western Electric Company, Incorporated
New York, New York
a corporation of New York

[54] METHODS OF AND APPARATUS FOR STORING AND TESTING PARAMAGNETIC ARTICLES
18 Claims, 10 Drawing Figs.

[52] U.S. Cl. .................................................. 209/73,
198/33, 209/81, 221/266
[51] Int. Cl. .................................................. B07c 1/06
[50] Field of Search .......................................... 209/73, 81;
198/33(R)1, 41; 221/266, 277

[56] References Cited
UNITED STATES PATENTS
3,115,235 12/1963 Othon ........................ 209/81X
3,120,890 2/1964 Waltz ........................ 198/33

Primary Examiner—Richard A. Schacher
Attorneys—R. P. Miller, H. J. Winegar and M. Pfeffer ABSTRACT: A storage bin has a pair of horizontally extended upstanding walls which are parallel and spaced apart a distance slightly greater than the length of elongated paramagnetic articles. Horizontally extending plate magnets within each wall form a gap of uniformly increasing width to establish a magnetic field having a flux density which increases from the back end to the front end of the bin. A random mass of articles deposited in the back end of the bin are suspended and migrate toward, and congregate at, the front end of the bin where the articles are removed individually by a rotary member which is moved through a sector of the bin to attract and hold the articles.

Patented Nov. 3, 1970

METHODS OF AND APPARATUS FOR STORING AND TESTING PARAMAGNETIC ARTICLES

CROSS REFERENCE TO RELATED APPLICATION

This invention is related to subject matter disclosed in copending application Ser. No. 763,690 and filed Sept. 30, 1968 in the names of John F. Keating and Joseph A. Zutkis.

BACKGROUND OF THE INVENTION

1. Field of the Invention

This invention relates to methods of and apparatus for storing and testing paramagnetic articles and more particularly, to methods of and apparatus for establishing a magnetic field, the strength of which increases from one end of the bin to the other end, so that the articles migrate to and congregate at that end of the bin having the maximum flux density where the articles are then withdrawn individually and tested.

2. Description of the Prior Art

Paramagnetic articles, such as diodes having a center body with leads axially extending therefrom, must be, at different stages of the manufacturing process, handled in bulk. This results in entanglement, commonly referred to as hay stacking, of the leads of the diodes and further in lead bending or distortion. Lead distortion may lower the efficiency of succeeding operations, particularly those which are mechanized. Moreover, distorted leads may also influence adversely manual operations for which special part storage racks or tooling has been designed. Therefore, to insure undistorted leads on paramagnetic articles, such as diodes, additional lead straightening operations have been required in the past at various stages of the manufacturing operation in order to improve subsequent handling of the leaded articles.

It has been found that frequently a bulk of paramagnetic components, or articles, such as diodes, may be physically arranged in an orderly, uniform manner so that individual or predetermined numbers of the diodes may be withdrawn from a mass thereof in order to perform a particular operation. One of the difficulties in these manufactures resides in maintaining a sufficient rate of feeding of the diodes in an oriented manner between the successive stages of the manufacturing process so that the full capacity of adjoining assembly machines or testing apparatus might be utilized.

One prior art patent, U.S. Pat. No. 3,388,795 issued to J. E. Beroset and D. M. Large, includes an apparatus where a mass of elongated paramagnetic articles is spatially suspended in a bin between a pair of spaced and parallel magnetic plates with the elongated axes of the articles suspended along parallel magnetic lines of force established between the plates. Some of the theoretical considerations involved in this apparatus are discussed in an article "Magnetic Suspension Parts Handling" authored by J. E. Beroset, H. A. Griesemer, D. M. Large and K. C. Whitefield and published in the July 1967 issue of the Western Electric Engineer. A movably mounted pickup member is moved in a first direction transverse to the lines of force between the magnetic plates to attract and hold a predetermined number of articles, and then in a second direction out of the magnetic field, where the articles are pulled from the pickup member, tested, and subsequently sorted.

In the magnetic field, a force is exerted on paramagnetic articles or diodes to move the articles to a position of maximum attainable flux density. With the flux densities now attainable in soft magnetic materials, such as those of which the diode leads are made, the magnetic forces form a uniform magnetic field which supports the diodes along the longitudinal axes of the leads of the diodes. With reasonable axial symmetry in the longest dimension, the diodes, when aligned in the magnetic field, will be quite stable.

Once the diodes are placed in the bin, the diodes become magnetized. Since the diodes have the same magnetic polarity along the length thereof, the diodes repel one another and as a result, they are maintained in a separated manner. The combination of magnetic, gravitational, and low end friction forces on the leads against the bin walls render the magnetic bin a storage facility which is easy to load and to empty.

For the magnetic handling of diodes, permanent magnets provide the simplest and most economical magnetic field, since once the required field strength is determined, no variation thereof is necessary. However, the relatively long air gaps needed for storing quantities of leaded diodes requires permanent magnets with both a high coercive force and a high energy product. In order to obtain the required flux density across such large air gaps, permanent magnets of massive size would have been required. However, recently the use of ferrites has yielded excellent materials for magnetic applications requiring reduced core losses and increased resistance to demagnetization, and provide an excellent source of sufficient flux intensity across large air gaps with only short magnet lengths.

The flux density in a storage bin described hereinbefore and along the center plane thereof are the most effective in suspending the diodes. Moreover, since the flux density in the center plane is greatest in the middle area thereof, diodes tend to collect about the middle area of the bin. Heavier diodes tend to collect about the lower portion of the middle area of the bin because of the effect of higher gravitational forces.

In practice, it has been found that the pickup member is most efficient in attracting and holding the elongated paramagnetic articles when moved to a center area of each of the aligned storage bins. However, since the rate of withdrawal of the articles from the bins is important, the moving of the pickup member into the center of each bin requires a longer stroke and additional time over that which would be required if the articles could be withdrawn from one end of the bin. A feature of this invention is to provide a storage bin having internal facilities for conveying the articles to one end of the bin so that the pickup member may attract and hold successively individual articles at the one end of the bin thereupon obviating a part of the previous travel distance of the pickup member.

Since the paramagnetic articles are initially deposited randomly in the bin, the movement of the pickup member into a front end of the bin pushes the articles toward the back end of the bin, but the articles redistribute themselves about the center of the bin. Moreover, the velocity of the pickup member must be reduced after the pickup member enters the bin in order to reduce substantially the shock effects on a mass of somewhat fragile paramagnetic articles such as diodes when engaged by the relatively massive traveling pickup member.

There is a further need for additional apparatus of the type described in order to facilitate the removal of all of the paramagnetic articles within each bin from one end of the bin. In this way, an operator may resupply the bin with additional articles without interfering with the pickup member by loading the additional articles into the back end of the bin.

Accordingly, this invention provides a new and improved storage bin for paramagnetic articles which may be used in conjunction with the apparatus of the aforementioned patent together or with a new improved rotary device moved into a sector of the bin to facilitate the removal of articles from the front end of the bin. In this way, the capacity of the bin will be enlarged since the bin length can be materially increased without increasing the length of travel of the pickup member. Also, the effective hourly output of withdrawal of articles from the bin will increase while simultaneously reducing the possibility of damage to the articles.

Therefore, an object of this invention resides in methods of and apparatus for conveying a mass of paramagnetic, elongated articles which are suspended along horizontal parallel lines of force from one end of a magnetic field to the other end of the field whereat the articles are removed from the magnetic field and tested.

SUMMARY OF THE INVENTION

An object of this invention is to provide new and improved methods of and apparatus for storing paramagnetic articles and to establish within the bin a magnetic field having parallel horizontal lines of force, the flux density of which increases from a first end of the bin to the opposite end of the bin whereat a rotary member is moved through a sector of the bin to attract and hold articles for removal from the bin.

With these and other object in mind, the present invention contemplates methods of and apparatus for storing a mass of paramagnetic articles in a magnetic field having parallel horizontal lines of force with the strength of the magnetic field increasing from a first or back end of the field to the opposite or front end of the field so that the paramagnetic articles migrate toward that end of the field having the maximum flux density where the articles are removed from the field.

More particularly, a mass of elongated, paramagnetic articles, each of which has a center body portion with leads axially extending therefrom, are deposited randomly within a storage bin device which includes a pair of spaced, parallel walls upstanding from a base. The walls are spaced apart a distance slightly greater than the length of the paramagnetic articles. A plate magnet is positioned within each of the walls at an acute angle to a longitudinal center line of the bin. In this way, a uniformly varying gap is formed between the plate magnet and the wall to establish a magnetic field with horizontal lines of force between the upstanding walls and having a maximum flux density at the opposite or front end of the bin where the one ends of the plate magnets are closest to each other, and having a minimum flux density at the first or back end of the bin where the other ends of the plate magnets are furtherest from each other. A rotary member is moved into and through a sector of the bin device at the front end thereof to engage and remove articles from the field. The articles are tested as the articles are removed from the field and are sorted in accordance with test characteristics.

Other objects and advantages of the present invention will be apparent from the following detailed description when considered in conjunction with the accompanying drawings.

DETAILED DESCRIPTION OF THE INVENTION

Figure 1:
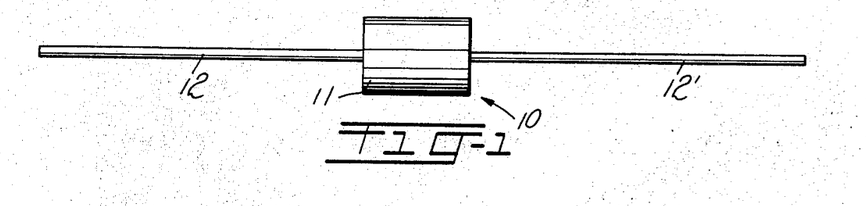
FIG. 1 is a view of a typical component, a mass of which may be suspended and then removed in predetermined numbers and thereafter sorted and tested by practicing the methods of and utilizing the apparatus constituting the member invention.

Referring to FIG. 1, there is shown a diode, designated generally by the numeral 10, of the type that may be mass loaded into an apparatus embodying the principles of the invention disclosed in the aforementioned U.S. Pat. No. 3,388,795, and of the present invention, and then magnetically withdrawn therefrom in predetermined quantities. The diode 10 has a semiconductor body 11 having paramagnetic leads 12 and 12' axially extending therefrom.

Figure 2:
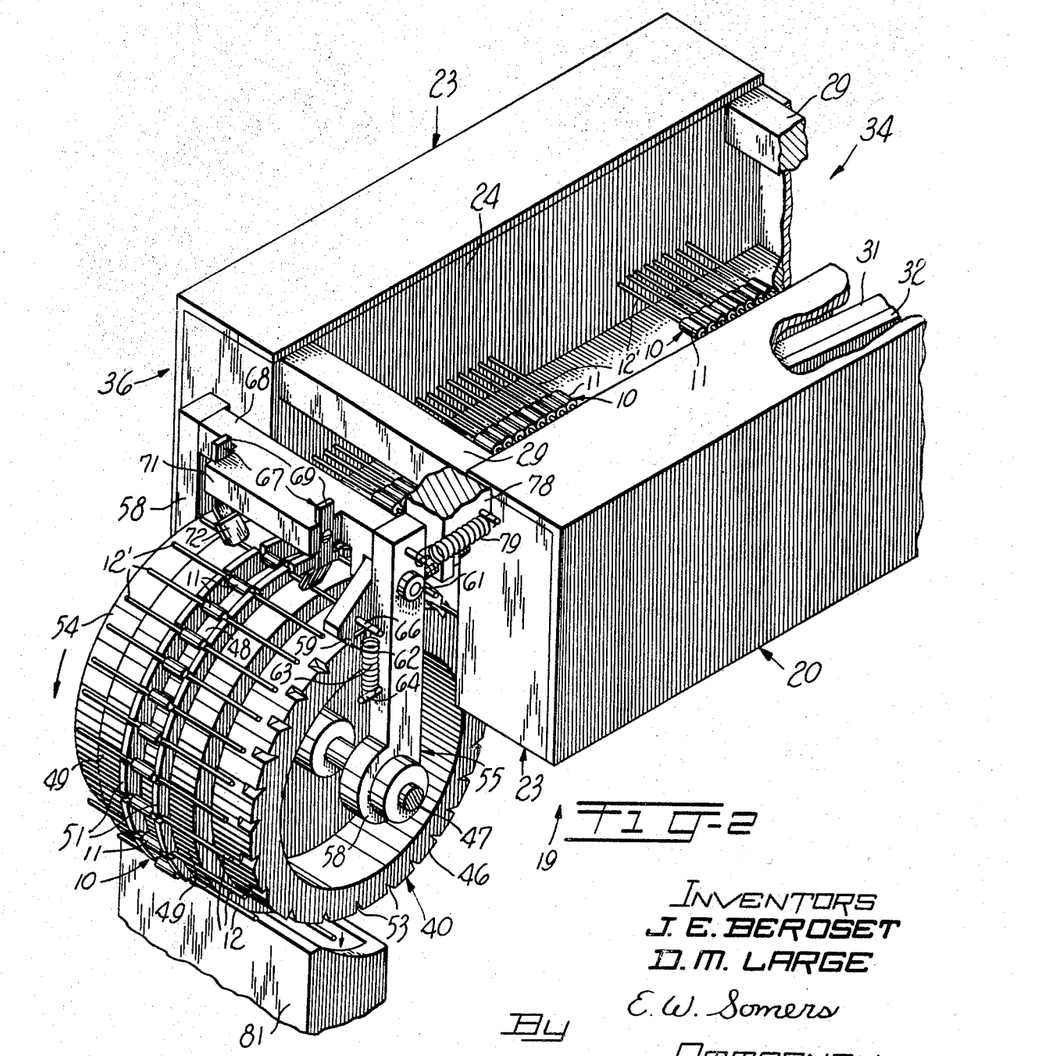
FIG. 2 is a perspective view partially broken away of a bin embodying the principles of the present invention and showing a mass of paramagnetic articles suspended along horizontal lines of force with a rotary pickup and test member mounted for movement into one end of the bin.

In general, an apparatus 19 for storing and testing diodes 10 includes a magnetic storage bin 20 having horizontal lines of force and a flux density which increases from a back end 34 to a front end 36 of the bin (See FIG. 2). A mass of diodes 10 which are deposited randomly in the back end 34 of the bin 20 are suspended along the lines of force and are urged by the gradient in magnetic force and gravitational force components induced by tilting the bin to move toward and congregate at the front end 36 of the bin. A rotary device 40 is moved rotatably through a sector of the front end of the bin 20 to attract and hold successive ones of the diodes 10 which are subsequently tested by a test device 55 as the diodes are conveyed out of the bin. The diodes 10 are stripped individually from the rotary device 40 and sorted in accordance with a test characteristic.

Figure 3:
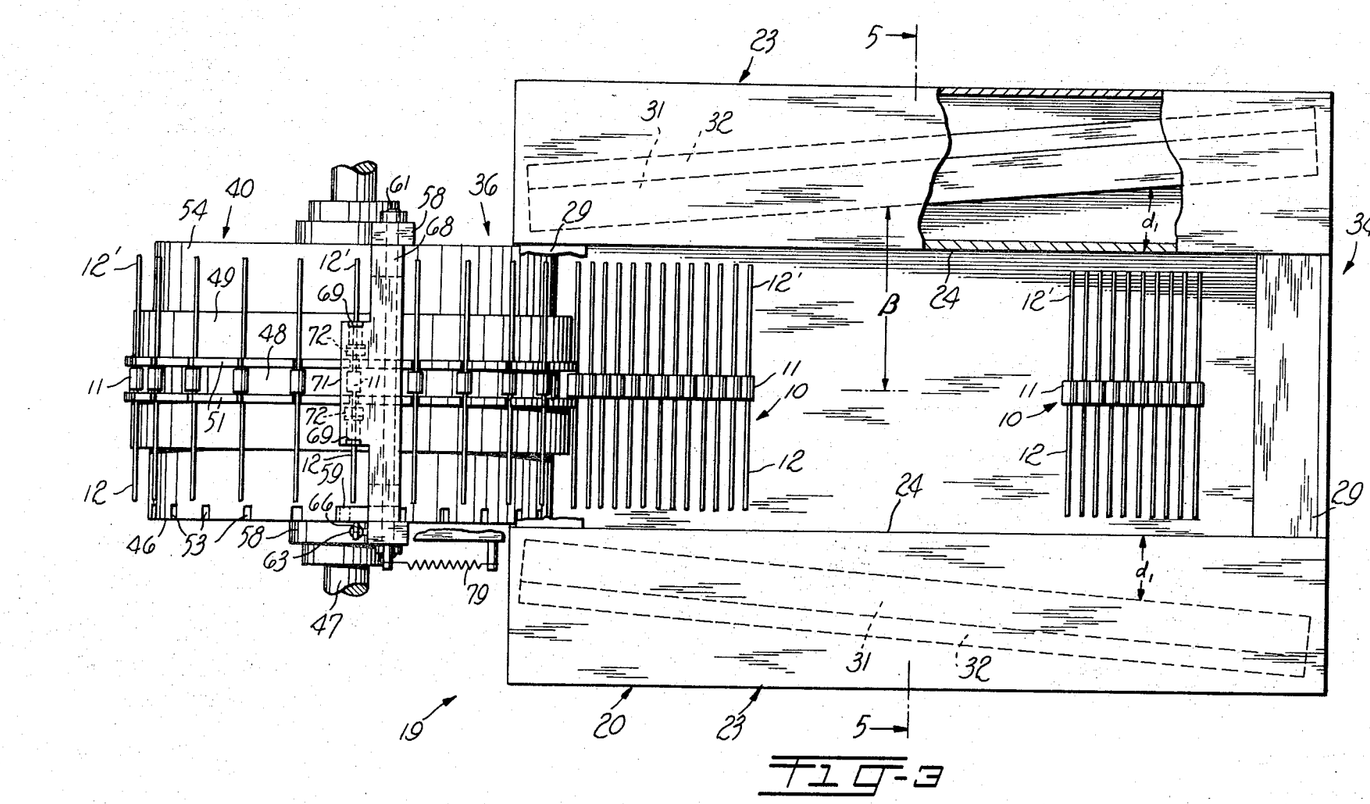
FIG. 3 is a plan view partially broken away of the magnetic bin shown in FIG. 2 and depicting the position of plate magnets in each of a pair of upstanding walls between which are suspended the paramagnetic articles and the rotary pickup member.
Figure 4:
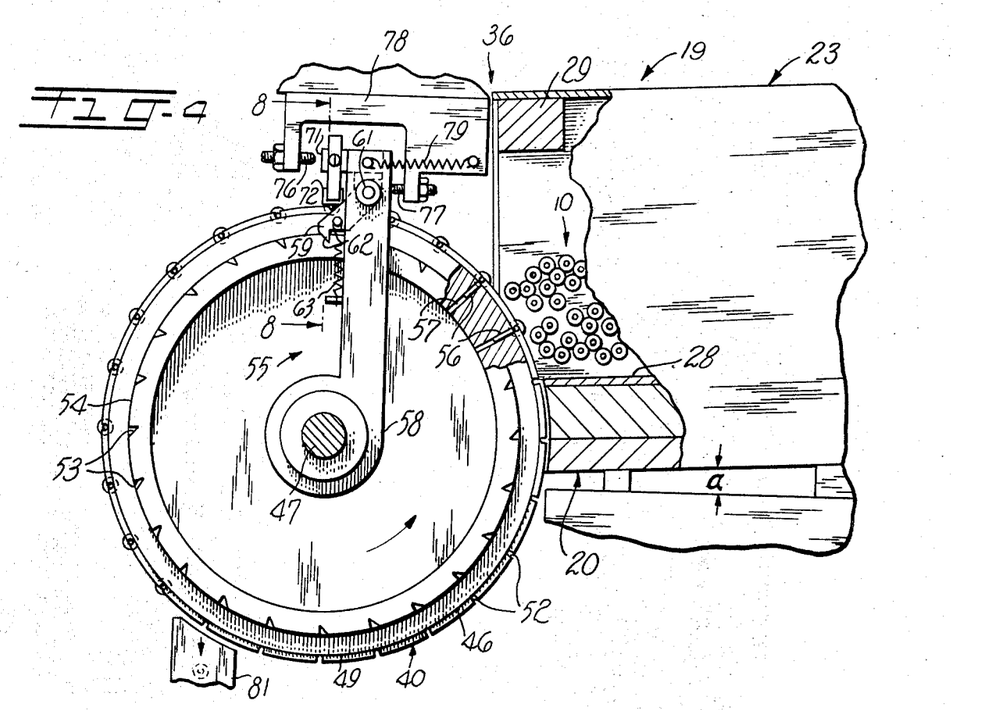
FIG. 4 is a side view partially broken away showing end views of the mass of paramagnetic articles suspended along the lines of force of the magnetic bin.

Attention is now directed to FIGS. 2, 3 and 4 which show an apparatus designated generally by the numeral 19 which includes a bin designated generally by the numeral 20 for magnetically storing a mass of the axially leaded components 10 and from which selected quantities thereof are withdrawn. The bin 20 includes a base plate 21 on which is mounted a spacer block 22 (See FIG. 5). The spacer block 22 has a length equal to that of the base plate 21, but is narrower in width than the base plate. A pair of horizontally extending, upstanding walls, designated generally by the numerals 23, are secured to the base plate 21 and the spacer block 22.

Figure 5:
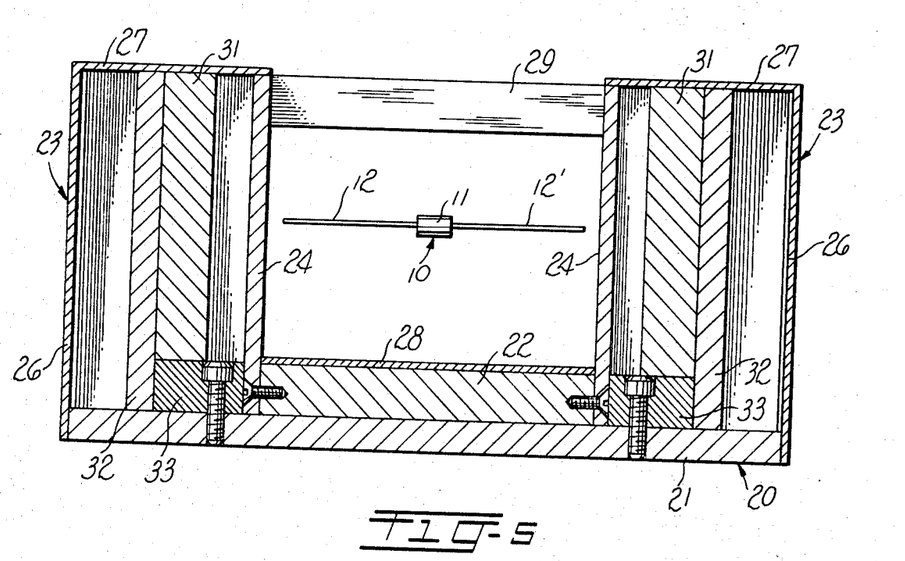
FIG. 5 is an end view in section taken along lines 5–5 in FIG. 3 and showing the mass of paramagnetic articles suspended along the magnetic lines of force in the magnetic bin.

Each of the walls 23 includes an inner plate 24 and an outer plate 26, both of which are constructed of nonmagnetic stainless steel. The use of the adjectives "inner" and "outer" is to distinguish that part of the bin 20 closer to the longitudinal center line of the bin as opposed to that part farthest therefrom. The outer plate 26 extends downwardly and overlaps the sides of the base plate 21 and is attached thereto. A top cover plate 27 may be formed by bending an upper portion of the outer plate 26. The top plate 27 rests on the inner plate 24 and extends the length of the base plate 21. The inner plates 24 are fastened along a lower portion thereof to the spacer block 22. A bed plate 28 is supported on the spacer block 22 between the inner plates 24 of the upstanding walls 23.

As can be seen in FIGS. 3 and 5, the walls 23 are spaced apart a distance slightly greater than the length of the paramagnetic articles 10. Moreover, the spacing between the walls 23 is maintained and stabilized by a pair of spreader blocks 29 which are mounted at both top end portions of the storage bin 20. Each of the spreader blocks is fastened to the inner plates 24 of the walls 23.

Referring now to FIG. 3, a pair of plate magnets 31 and 32 may be positioned within each of the walls 23 for establishing a strong magnetic field. A tapered block 33 is formed with a tapered edge along the outer side thereof. Each of the outer plate magnets 32 is positioned within one of the walls 23 so that the outer plate magnet rests on top of the base plate 21 and is in contact with the tapered edge of the block 33 (See FIG. 5).

In order to complete the magnetic arrangement within each of the walls 23, the inner plate magnet 31 is positioned against the outer plate magnet 32 and rests on top of the tapered block 33. The upper edge of each of the plate magnets 31 and 32 is in contact with the underside of the top cover plate 27.

As can be seen in FIG. 3, the positioning of the plate magnets 31 and 32 within the walls 23 form a gap, designated by the distance $d_1$, between the inner surface of the plate magnet 31 and the inner plate 24 of the wall. This distance $d_1$ varies uniformly from a first or back end 34 of the bin device 20 to the opposite or front end 36 of the bin device. In this way, the magnetic field which is established between the plate magnets 31 and 32 in the pair of walls 23 increases in intensity from the right end of the bin 20 to the left end of the bin, as viewed in FIGS. 3 and 7. The flux density of the magnetic field which is established between the magnetic plates is a maximum at the left or opposite end of the storage bin 20, and is at a minimum at the right or first end.

Because of the angular arrangement of the magnetic plates 31 and 32, the magnetic field increases in strength or flux density toward the front end of the bin, and as a result, a paramagnetic article placed in such field will tend to align itself in that portion of the field having the maximum flux density. In effect, there are magnetic force components directed along the inner walls tending to shift the articles within the bin, which will be referred to hereinafter as $X_m$ forces (See FIG. 6). The force components spanning the walls, hereinafter designated $Y_m$ components, act to hold the articles suspended while the $X_m$ components urge the diodes suspended along the $Y_m$ lines of force in an "X" or longitudinal direction (See FIG. 6), and toward the left end of the bin.

In addition, as shown in FIG. 4, the storage bin 20 is tilted slightly, at an angle $\alpha$, to the horizontal with the left end lower than the right end. In this way, a gravitational force component, hereinafter designated $X_w$, further acts on the diode 10 in cooperation with the $X_m$ force components to urge the diodes toward the left end of the storage bin 20 and to congregate slightly below the vertical center of the storage bin.

It has been found that the angle $\alpha$ which the bin forms with the horizontal in order to obtain optimum efficiency and greatest utilization of the gravitational force component $X_w$ is a function of the weight of the paramagnetic articles 10. Specifically, the angle $\alpha$ of the bin proportional to the weight of the article 10. The less mass the article 10 possesses, the less the angle $\alpha$ of tilt must be. In the bins now in use, the base plate is tilted approximately 4 degrees to the horizontal plane.

The angle $\rho$ which the magnetic plates 31 and 32 form with a longitudinal center line of the storage bin 20, as viewed in FIG. 3, is a function of the characteristics of the articles which are stored in the bin. In order to obtain optimum migration of the articles or diodes 10 toward the left end of the bin, the mass of the diodes as well as the magnetic characteristics of the leads 12–12' must be taken into account. In one instance, it has been found when handling lightweight diodes that an angle between the magnetic plates 31 and 32 and the longitudinal center line of the bin of approximately 4 degrees yields optimum results.

The base plate 21, as well as the side plate 26 and depending portion 27 thereof, may be shaped from standard low carbon steel. The inner plate 24 should be made of a low friction relatively nonmagnetic material, such as stainless steel. The low friction characteristic of the inner plates 24 is required in order to prevent damage to the ends of the leads 12–12' when moving along the inside of the bin 20. The bed plate 28 may also be made from a low friction material; but this is not necessary since, for reasons soon to become apparent, the diode leads will most likely not contact the bed plate. Therefore, the bed plate 28 could be made of a nonmagnetic material, such as aluminum.

An alternative embodiment would employ plate magnets 31 in each of the walls 23 with the plate magnet 32 replaced with a back-up plate 32 made of a low carbon steel. Since the base plate 21 is also made from a low carbon steel, the base plate and the back-up plates 32 form a U-shaped low reluctance return path for the magnetic field between the walls 23. The low reluctance return path increases the density of the flux thereupon permitting the use of fewer magnets or less powerful magnets. The low reluctance flux return path has a dual function of serving as a shield to reduce the magnetic effects of the storage bin on adjacent equipment such as relays, reed switches, and solenoids.

In practicing the method of the present invention, operator loads manually or by some conveying means (not shown) a mass of randomly oriented paramagnetic articles 10 into the storage bin 20, whereupon the mass of articles is suspended in an orderly fashion along the horizontal parallel lines of magnetic force, as shown in FIGS. 2, 3, 4 and 5 and are urged to congregate at the left end of the storage bin. Then a rotary pickup device, designated generally by the numeral 40, is continuously rotated through the left-hand end of the storage bin 20 to attract and hold a predetermined number of the paramagnetic articles 10. As the pickup device moves into the bin 20, and removes successively articles 10 from the mass thereof at the left-hand end, the additional masses of articles randomly deposited in the bin migrate toward the left end of the bin where the flux density of the magnetic field is at a maximum.

Figures 6, 7:
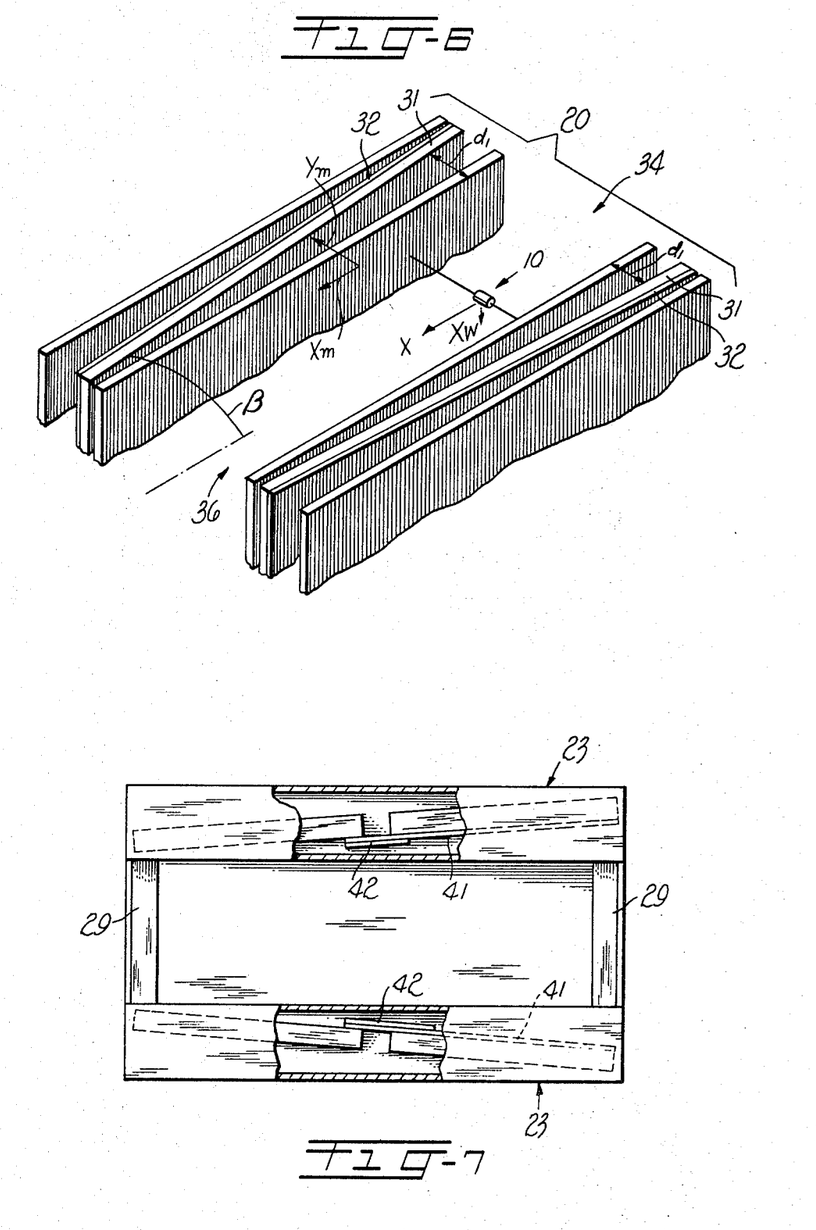
FIG. 6 is a force vector diagram illustrating the several forces operating on the diodes within the storage bin device.
FIG. 7 is a plan view partially broken away of a substantially longer bin than that shown in FIG. 2 embodying the principles of the present invention and depicting the position of plural plate magnets in each of a pair of upstanding walls.

As can be seen in FIG. 6, the angular orientation of the plate magnets 31 and 32 within the walls 23 of the storage bin 20, in effect, establishes a longitudinally extended magnetic field in which the magnitude of the flux density varies from a maximum at the left end 36 of the storage bin 20 to a minimum at the other, or right end 34, of the storage bin. The magnetic flux density develops a force component, $X_m$, along the surface of the inner walls 24 which are proportional to the change in flux density divided by the change in distance X, and which, for a linearly graded flux density is a constant. In this way, the paramagnetic articles are not only suspended along the lines of force, but are also acted upon by a component along the surfaces of the inner wall plates 24 which thereupon tends to move the articles toward the left end 36 of the bin. Moreover, the tilting of the storage bin 20 allows the gravitational force component $X_w$, hereinbefore described, to act on the diodes 10 to further urge the diodes toward the left end of the storage bin.

By utilizing this storage bin with a tapered magnetic field, there is a constant flow of successively deposited masses of the articles into the vicinity of the pickup, or lower left end, of the pickup device 40. By maintaining a constant supply of paramagnetic articles 10 within reach of the pickup device 40, access time for picking up the paramagnetic articles is minimized. Moreover, the movement of the articles 10 within the storage bin 20 permits a continuous, or incremental, conveying of additional paramagnetic articles into the storage bin. The geometry of the pickup member 40, as disclosed, is arranged so that only a predetermined number of diodes 10, in this case one, can be attracted in seriatim and removed from the storage bin 20.

It appears in FIG. 4 that some of the diodes 10 would come to rest against the bed plate 28 and hence would never be picked up by the pickup device 40. However, the intensity of the magnetic field, between the walls 23, when viewed from FIG. 4 varies from a minimum at the top of the bin 20 to a maximum somewhere near the midpoint of the height of the magnetic plates 31 and 32, and then back to a minimum near the bed plate 28. This occurs because near the top and bottom of the magnetic plates 31 and 32, the magnetic lines of force tend to become established in paths other than solely between the walls 23. Therefore, the diodes 10 in seeking a position of rest where the magnetic flux density is at a maximum tend to move to the approximate midheight of the walls 23. For the lighter diodes 10, the vertical gravitational force components do not overcome the magnetic force components $Y_m$ and the diodes tend to congregate about the midheight of the inner plate 24 at the left end of the storage bin 20.

However, when using the storage bin 20 to store heavier diodes 10, it may be necessary to utilize a shading strip of magnetic material between the bottom of the magnetic plates 31 and 32 and the top of the spacer block 22. In this way, the lines of magnetic force between the walls 23 will not exist below the bottoms of the magnetic plates 31, thereupon tending to keep the diodes 10 above the bed plate 28 so that they may be captured by the pickup device 40.

In another embodiment employing the principles of the present invention, provisions are made for increasing the capacity of the storage bin by increasing the length of the bin (See FIG. 7). However, commercially available plate magnets are not manufactured in those lengths which would be required to substantially lengthen the bin. Therefore, it is necessary to place several magnets butted end to end within each of the bin walls.

The problem arises, however, that when the plate magnets are butted end to end, the magnetic field within the bin is no longer substantially uniformly varying because of a strong concentration of flux lines of magnetic force at the joints between abutting magnets. This localized build up in field strength cannot be overcome by increasing the angle $\beta$ between the inner face of the wall 23 and the plate magnets. If the angle $\beta$ were increased, a point of diminishing return would be reached when the magnetic strength of the field is no longer adequate to suspend the diodes against the downward urging of gravitational forces and the diodes would fall to the bottom of the bin.

As shown in FIG. 7, adjacent magnets in each wall are spaced apart with a gap therebetween and shading strips 41 and 42 made from a low carbon steel, and in the configuration shown, are used to span across the gap. By employing the shading strips 41 and 42, the magnetic field is weakened in the vicinity of the joint between adjacent magnets and the uniform magnetic field is established. The configuration of shading strips with the shading strip 42 substantially shorter than the shading strip 41 shown in FIG. 7 was arrived at empirically.

It will be observed from FIG. 7 that the alignment of the shading strips 41 and 42 on one side of the longitudinal center line of the bin is not symmetrical with the other side. If the alignment were symmetrical, an abrupt change in field strength would occur. To avoid sudden changes in the flux density, the ends of the shading strips are staggered on opposite sides of the longitudinal center line of the bin.

As shown in FIGS. 2 and 4, the device 40 for conveying and testing the articles 10 includes a rotary member or feed wheel 46 mounted on a shaft 47 so that the rotary member is rotated through the left-hand end of the bin 20 as viewed in FIGS. 2, 3 and 4. The rotary member 46 is constructed of an electrically nonconductive material and is dimensioned to attract and hold a predetermined number of articles 10 as the rotary member is moved rotatably through the magnetic field.

Referring now to FIGS. 2, 4, 8 and 9, the rotary member 46 may have a plurality of nesting slots 48 cut transversely in a peripheral face 49 of the rotary member. The rotary member 46 is also formed with a pair of spaced ridges 51 circumscribing the peripheral edge of the rotary member with one of the ridges on each side of the row of nesting slots 48. Each of the ribs 51 is formed with a plurality of slots 52 cut transversely thereacross with opposed slots in the spaced ribs aligned with each other and with the longitudinal center line of the nesting slot 48 interposed therebetween.

Figure 9:
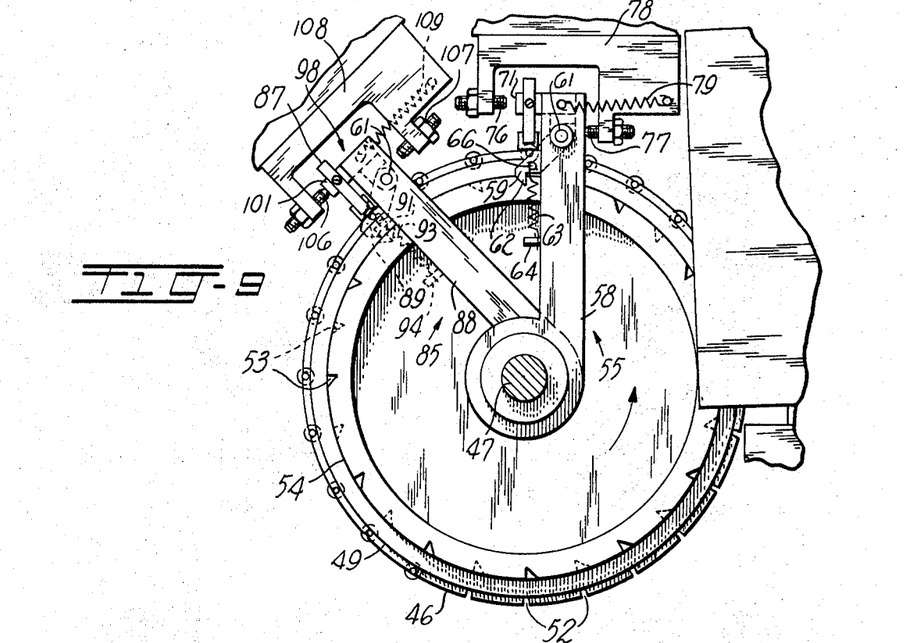
FIG. 9 is an elevational view of an apparatus embodying the principles of the present invention and having a pair of test members mounted on a rotary pickup member with each of the test members used to test paramagnetic articles held in alternate nests formed in the peripheral face of the rotary test member.

A plurality of ratchet slots 53 are also formed in a stepped down portion 54 of the peripheral face 49 with each of the ratchet slots aligned with one of the nesting slots 48 (See FIGS. 4 and 9).

Figure 8:
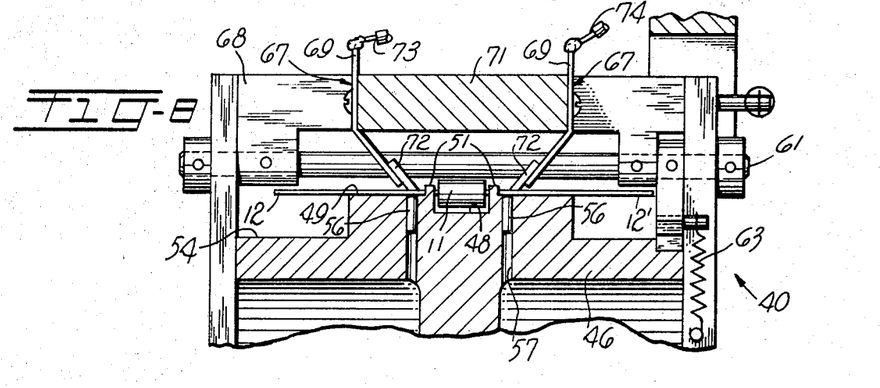
FIG. 8 is an enlarged end elevational view of the rotary pickup and test member in section taken along lines 8–8 in FIG. 4 and showing one of a pair of probes in contact with the leads of a paramagnetic article received in a nest formed in the peripheral edge of the rotary member.

In order to attract and hold each of the articles 10 to the rotary member 46 as the rotary member is moved through a sector of the field, pole magnets 56 are positioned in bores 57 formed in the rotary member along radial lines aligned with each of the nesting slots 48 (See FIGS. 4 and 8). The pole magnets 56 are spaced apart a distance slightly greater than the length of the body 11 of the diode 10 so as to engage the leads 12-12' (See FIG. 8).

The ridges 51 are used to nest the leads 12-12' of the elongated articles 10 instead of using a groove cut transversely entirely across the peripheral face 49 of the rotary member 46. In this way if the leads 12-12-, being slender members, are slightly bent or curved, it is much easier to nest only a portion of the lead rather than the entire length thereof. Of course, a wide groove could be cut in the peripheral face 49 of the rotary member 46 to avoid this problem, but then the bottom portions of the slots in the ridges could be so exposed as to attract more than one article.

It is not necessary for practicing this invention to use a rotary member 46 having a plurality of slots 48 cut therein. For those diodes 10 having relatively small bodies 11, the peripheral face 49 of the rotary member 46 may merely have a pair of spaced ridges 51 formed thereon with aligned ratchet slots 53 cut in the stepped down portions 54 of the rotary member (See FIG. 2). In this way, the leads 12 of each of the diodes 10 is supported against the peripheral face 49 of the rotary member 46 for determining a test characteristic of each of the diodes with a test device, designated generally by the numeral 55 and similar to that disclosed in copending application Ser. No. 763,690 filed Sept. 30, 1968.

The test device 55 includes a pair of levers 58 which are rotatably mounted on the shaft 47 adjacent the radial faces of the rotary member 46. One of the levers 58 has a pawl 59 pivotally mounted on a pin 61 on the free end thereof (See FIGS. 2 and 4). The pawl 59 has a toothed portion 62 which engages successive ratchet slots 53 on the rotary member 46. The toothed portion 62 is held within each successive ratchet slot 53 by a tension spring 63, one end of which is fastened to a post 64 on the lever 58 and the other end of which is attached to a lug 66 extending laterally from the pawl 59.

In order to test the diodes 10, a pair of spaced contacts, designated generally by the numerals 67, are supported from a cross member 68 which spans the peripheral face 49 of the rotary member 46 and is attached to the levers 58 (See FIGS. 2 and 8). As is shown in FIG. 8, an upper end 69 of each of the contacts 67 is attached to a block 71 on the cross member 68. The block 71 is made from an electrically insulative material to isolate the contacts 67 from ground and from each other. A lower element 72 of each of the contacts 67 is attached to each of the upper portions 69 and is positioned with respect to the peripheral face 49 of the rotary member to provide an urging electrical contact with the leads 12-12'. An electrical circuit is completed from a test set (not shown) through a conductor 73 through one of the contacts 67 to the lead 12 and then through the lead 12' back through the other contact 67 and a secured conductor wire 74 to the test set.

As may best be seen in FIG. 4, the rotation of the lever 58 is limited between a first stop member 76 and a second stop member 77 which are mounted in a frame 78. The frame 78 is mounted separate and apart from the test device lever 58. Moreover, the lever 58 is biased in a clockwise direction into engagement with the second stop member 77 by a tension spring 79 which has one end attached to the lever and the other end attached to the frame 78.

OPERATION

An operator loads a mass of paramagnetic articles 10 into the right-hand end 34 of the storage bin 20 whereat the magnetic field between the plate magnets 31 and 32 has a minimum flux density. Because of the arrangement of the magnets 31 and 32 in the walls 23 of the storage bin 20, the articles migrate under the urging of gravitational and magnetic forces toward the lower left-hand end 36 of the storage bin.

As the rotary member 46 is moved through a sector of the bin 20 in a counterclockwise or first direction to attract and hold successive articles 10, the pawl 59 having the toothed portion 62 in one of the ratchet slots 53 rides with the rotary member and rotates the lever 58 in the counterclockwise direction as viewed in FIG. 4. Then, when the test device 55 is urged in a clockwise or second direction, and the contacts 67 initially engage the leads 12-12', the contacts make wiping contact with the leads of the diode 10. After the pawl 59 has engaged one of the slots 53 and the test device 55 rides with the rotary member 46, there is no relative motion between the contacts and the leads. An electrical circuit is complete from the test set (not shown) through the conductors 73 and 74 and the contacts 67 and an electrical test is performed on the diode article 10 in that nesting slot 48 aligned with the ratchet slot 53 currently engaged by the pawl 59.

When the test is completed, the block 71 extending from the upper end of the lever 58 (See FIG. 4), engages the stop member 76 which is mounted on the frame 78 independent of the rotary member 46. The rotary member 46 continues to rotate in a counterclockwise direction, but the lever 58 is held against the stop member 76. As the rotary member 46 is rotated the pawl 59 is pivoted about the pin 61 to move the toothed portion 62 out of the ratchet slot 53 whereupon the lever is urged in a clockwise direction as viewed in FIG. 4 by the tension spring 79.

The lever 58 rotates about the shaft 47, until the lever engages second stop member 77 (See FIG. 4). Meanwhile, the rotary member 46 has continued to rotate counterclockwise, as viewed in FIG. 4, and the toothed portion 62 of the pawl 59 rides over the stepped down portion 54 of the peripheral face 49 of the rotary member until the toothed portion is urged into the next successive ratchet slot 53 by the tension spring 63. At that time, the contacts 67 on the test device 55 engage the leads 12-12' of the diode 10 in the next successive nesting slot 48. The diodes are subsequently stripped from the rotary member 46 and sorted in accordance with the result of the test by any of several commercially available devices, designated generally by the numerals 81 (See FIGS. 2 and 4).

The sorting device 81 may include any of several commercially known stripping devices, all well known in the art for stripping the diodes 10 from the rotary member 46. For example, the stripping device (not shown) may comprise fixed stripping blades on opposite sides of the rotary member 46 to engage the leads 12-12' or a pair of blades which move a short distance with the rotary member. Alternately, the stripping device may comprise solenoid actuated devices which are operated to pluck the tested diodes 10 from the rotary member 46.

DESCRIPTION OF ALTERNATIVE EMBODIMENT

It would be within the scope of this invention to use a second test device 85 together with the test device shown in FIG. 4 (See FIG. 9). The second test device is identical to the first test device 55 and includes a pair of levers 88 having a pawl 89 mounted pivotally on a pin 61 projecting inwardly from the lever on the far side of the rotary member 49 as viewed in FIG. 9. The pawl 89 has a toothed portion 91 which is held in engagement with one of a plurality of ratchet slots 53 on the stepped down portion 54 of the peripheral face 49 of the rotary member 46 on the far side of the rotary member by a spring 93. The spring 93 is attached to the pawl 89 at one end and at the other end to a post 94 on the lever 88. Electrical contact with the leads 12-12' of the diodes 10 is established through a pair of spaced contacts 87 which are supported from a cross member 98 which connects the two levers 88.

The rotary movement of the test device 85 is limited between a first stop member 106 and a second stop member 107 which are attached to a frame 108. The frame 108 is independent of and unconnected to the second test device 85.

In using the rotary member 46 having two test devices 55 and 85, several advantages occur. As will best be seen from FIG. 9, the ratchet slots 53 in the stepped down portion 54 of the peripheral face on the near side of the rotary member are offset from and interposed between the ratchet slots 53 on the far side of the rotary member. The levers 58 and 88 are arranged so that as one test device 55 is testing, the other test device is being returned to an initial position to engage with the next alternately spaced diode 10. In this way, the time for sorting a mass of articles 10 is reduced. Moreover, since only one test device 55 or 85 is in engagement with one of the diodes 10 at one time, a single test circuit may be used with parallel connections to the test devices. Hence, no elaborate switching mechanism is required between test devices and the test set.

OPERATION OF ALTERNATIVE EMBODIMENT

Figure 10:
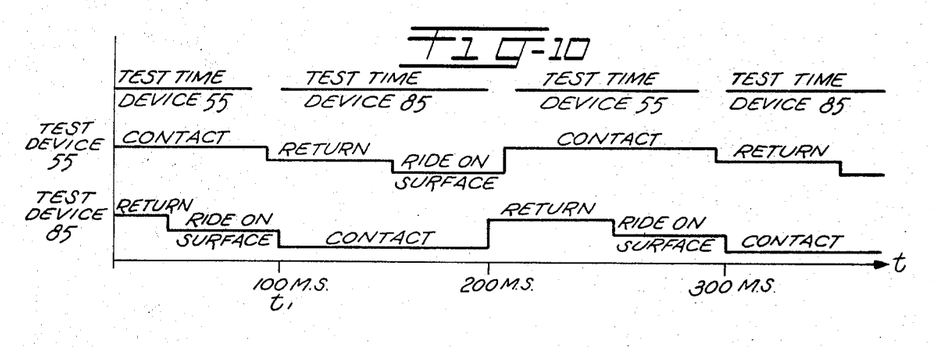
FIG. 10 is a timing diagram which may be used together with the detailed description to explain the utilization of a pair of test devices on the rotary test member.

A typical cycle of operation for an apparatus 19 which includes a rotary member 46 and a pair of test devices 55 and 85 is portrayed in FIG. 10. As can be seen, at the time the contacts 67 initially engage the leads 12-12' of a diode 10, the block 101 of the test device 85 is engaged by the stop member 106 to move the tooth 92 out of the ratchet slot 53 on the far side of the rotary member.

As the pawl 59 and contacts 67 ride with a diode 10, the tension spring 109 urges the lever 88 clockwise until the lever engages the stop member 107. The rotary member 46 is continuously rotated in a first or counterclockwise direction, as viewed in FIG. 9, and the pawl 89 rides along the stepped down portion 54 of the peripheral face 49 with the contacts 67 held out of engagement with the leads 12-12' of the diodes 10. As the next successive slot 53 on the far side of the rotary member 46, as viewed in FIG. 9, is moved into registration with the test device 55, the spring 93 urges pivotally the pawl 89 in a counterclockwise direction until the toothed portion 92 seats in the next successive notch 53 in the stepped down portion 54 on the far side of the rotary member as shown in FIG. 9. This is shown as time $t_1$ in FIG. 10.

Just prior to time $t_1$, the block 71 engages the stop member 76 whereupon the pawl 59 is urged out of the notch 53 as the rotary member continues to rotate in a counterclockwise direction as viewed in FIG. 9 and the spring 79 urges the arm 58 pivotally in a clockwise direction while the second test device is testing the diode 10. In this way each test device 55 and 85 tests alternate diodes 10.

It should be realized that the principles of the present invention could be utilized in many devices, or conveying apparatus, in order to move a plurality of paramagnetic articles from one location to another in order to supply constantly various operations which may be performed on the articles.

The above-described apparatus merely exemplifies the principles of the present invention. Persons having ordinary skill in the art may modify the apparatus without departing from the scope of the invention.

We claim:

1. In a method of storing and testing elongated paramagnetic articles:
   establishing a magnetic field which increases in flux density from a first end to a second end thereof for suspending magnetically a mass of said articles while urging said mass of articles to move and congregate at said second end thereof;
   depositing a mass of articles in said first end thereof whereupon said articles are urged toward said second end thereof; and
   selectively engaging a predetermined number of articles within the suspended mass at said second end of said field and removing said predetermined number of articles therefrom to test the articles.

2. A method of using a pickup device having pairs of spaced pole pieces spaced therealong to remove a predetermined number of elongated paramagnetic articles from said field in accordance with the steps set forth in claim 1 said pole pieces having a magnetic strength greater than that of said magnetic field wherein the step of selectively removing a predetermined number of articles further includes moving said pickup device into and through a section of the magnetic field at said second end thereof to attract and hold said predetermined number of articles against said pole pieces.

3. In an apparatus for storing a mass of elongated paramagnetic articles and for testing the articles:

means for establishing a magnetic field having substantially parallel lines of force which increases in intensity from a first end of the field to an opposite end of the field to suspend the articles therealong while urging the mass of articles to move and congregate about said opposite end of the field; and test means moved into and through the opposite end of the field for attracting and holding a predetermined number of articles from the mass of articles and for testing the articles.

4. In a device for storing a mass of elongated paramagnetic articles and for sorting the articles into bins:

a first upstanding member;

a second upstanding member spaced from said first upstanding member a distance slightly greater than the length of said elongated paramagnetic article;

means for establishing a magnetic field between said upstanding members which field increases in intensity from a first end to an opposite end of said device for suspending magnetically said mass of articles while urging said mass of articles to move and congregate at said opposite end; and testing means mounted for movement into and through the opposite end of said field for removing articles from said opposite end of said field and for sorting said articles in accordance with a test characteristic.

5. In a device for storing a mass of elongated paramagnetic articles, as set forth in claim 4, wherein said magnetic field is substantially confined, in a vertical plane between said upstanding members, to an area having a base which is inclined to the horizontal whereupon gravitational forces act on said articles to further urge said articles toward said opposite end of the device.

6. In a device for storing a mass of elongated paramagnetic articles, as set forth in claim 4, wherein said means for establishing a magnetic field having an intensity which increases from a first end of the device to the opposite end comprises plate magnets positioned angularly to said upstanding members with a maximum distance therebetween at the first end of said device and a minimum distance therebetween at said opposite end of the device.

7. In a device for storing a mass of elongated paramagnetic articles, as set forth in claim 6, wherein said magnets are positioned with a bottom edge thereof forming an angle with a horizontal plane whereupon gravitational forces act on said articles to further urge said articles toward said opposite end of the device.

8. In an apparatus for individually testing elongated paramagnetic articles:

a bin having a pair of spaced parallel side walls, for receiving a supply of said articles;

a test wheel having transversely extending slots formed about the periphery thereof;

means for rotatably mounting the feed wheel to position a sector of said wheel between said side walls;

means for establishing a magnetic field between said walls which increases in intensity in a direction toward said sector to support and urge said diodes against the periphery of said sector; and means for rotating said wheel to remove articles positioned within said slots from said magnetic field to test said articles.

9. In an apparatus for suspending a mass of elongated paramagnetic articles in parallel relationship and for testing and sorting the articles:

a U-shaped structure having a pair of side walls spaced apart a distance greater than the length of the articles to be suspended;

means establishing a magnetic field between said walls which field increases in intensity from a first end to the opposite end of said structure for suspending said mass of articles while urging said articles toward the opposite end; and testing means mounted for movement into and through the opposite end of said field for removing articles from said opposite end of said field and for sorting said articles in accordance with a test characteristic.

10. A storage bin for holding a mass of elongated paramagnetic articles having leads axially extending from a center body thereof in parallel relationship, comprising:

a first upstanding wall;

a second upstanding wall having an inner surface spaced from and parallel to an inner surface of said first upstanding wall;

a pair of magnets positioned angularly within said walls with a varying distance between said magnets and the inner surfaces of said walls to establish a magnetic field between said walls, said field having a flux density which increases from a first end to the opposite end of said bin to establish magnetic force components directed both across the walls and along the length of the walls toward said opposite end, whereupon said articles are suspended in said magnetic field and are urged to congregate at the opposite end of the bin having the maximum flux density; and testing means mounted for movement into and through the opposite end of said field for removing articles from said opposite end of said field and for sorting said articles in accordance with a test characteristic.

11. A magnetic storage bin for suspending a mass of elongated paramegnetic articles having leads axially extending from a center body thereof, as set forth in claim 10, wherein said magnets are positioned so that bottom edges thereof form angles with a horizontal plane so that gravitational forces act on said articles to further urge said mass of articles toward said opposite end of the bin.

12. A magnetic storage bin for suspending a mass of elongated paramagnetic articles having leads axially extending from a center body thereof, comprising:

spaced magnetic means for establishing a magnetic field having parallel lines of force together with force components at an angle to the parallel lines of force, said magnetic field having a flux density which increases from a first end of said bin to the opposite end of said bin;

a pair of walls interposed between said spaced magnetic means, said walls parallel and spaced apart a distance slightly greater than the length of said paramagnetic articles;

whereby said mass of said articles are suspended along the lines of force and are urged toward and congregate at said opposite end of said bin by the force components; and testing means mounted for movement into and through the opposite end of said field for removing articles from said opposite end of said field and for sorting said articles in accordance with a test characteristic.

13. An apparatus for feeding a predetermined number of elongated paramagnetic articles having leads axially extending from a center body thereof, comprising:

a storage device which includes:

a first upstanding wall;

a second upstanding wall spaced from and parallel to said first upstanding wall;

magnetic means positioned within each of said walls for establishing a magnetic field having a flux density which increases from a first end of said device to the opposite end of said device for suspending a mass of said articles while urging said mass of articles toward the opposite end; and means moved into the opposite end of said device for attracting and holding said predetermined number of articles from the mass of articles urged toward the opposite end of said storage device to remove the articles therefrom.

14. In an apparatus for holding a mass of elongated paramagnetic articles having leads axially extending from a center body thereof in parallel relationship with each other and for testing and sorting the articles:

a first upstanding wall;
a first plate magnet positioned on one side of said first wall at an angle therewith whereupon a gap is formed between said magnet and said wall which varies uniformly along the length of said first magnet;
a second plate magnet positioned on the other side of said wall at an angle therewith where upon a gap is formed between said second magnet and said first wall which varies uniformly along the lengths of said second magnet;
a second upstanding wall interposed between said first wall and said second magnet, said second wall mounted parallel to said first wall and spaced therefrom a distance slightly greater than the length of said paramagnetic article;
whereby said mass of articles are held magnetically along the lines of force between said walls and are urged toward the end of the bin at which the distance between the two plate magnets is a minimum; and
testing means mounted for movement into and through the end of the bin at which the distance between the two plate magnets is a minimum for removing articles from the field and for sorting the articles in accordance with a test characteristic.

15. A storage bin for holding a mass of elongated paramagnetic articles having leads axially extending from a center body thereof in parallel relationship, and for sorting the articles in accordance with a predetermined test characteristic, comprising:
a first upstanding wall;
a second upstanding wall having an inner surface spaced from and parallel to an inner surface of said first upstanding wall;
a pair of magnets positioned angularly within said walls with a varying distance between said magnets and the inner surfaces of said walls to establish a magnetic field between said walls, said field having a flux density which increases from a first end to the opposite end of said bin to establish magnetic force components directed both across the walls and along the length of the walls toward said opposite end, whereupon said articles are suspended in said magnetic field and are urged toward the opposite end of the bin having the maximum flux density;
U-shaped means engaging the outer sides of said magnets and connected therebetween for forming a low reluctance return path to increase the flux density and the uniformity of said magnetic field in the gap between said walls; and
testing means mounted for movement into and through the opposite end of said field for removing articles from said opposite end of said field and for sorting said articles in accordance with said test characteristic.

16. In a storage bin for holding a mass of elongated paramagnetic articles having leads axially extending from a center body thereof in parallel relationship with each other and for sorting the articles in accordance with a test characteristic thereof;
a first upstanding wall;
a second upstanding wall spaced from and parallel to said first upstanding wall;
magnetic means positioned within each of said walls for establishing a magnetic field having a flux density which increases from a first end of said bin to the opposite end of said bin for suspending a mass of said articles while urging said articles toward the opposite end, which includes:
plural plate magnets placed end to end in each of said walls and having a gap between the ends thereof;
plural overlying members spanning said gaps between adjacent plate magnets in each of said walls for reducing magnetic edge effects and tending to maintain a uniform flux density along said wall, said plural overlying members having variable lengths and, further, said members on said first wall staggered from said members on the second wall to avoid abrupt changes in said magnetic field; and
testing means mounted for movement into and through the opposite end of said field for removing articles from said opposite end of said field and for sorting said articles in accordance with said test characteristic.

17. In an apparatus for transferring and testing electrical diodes having opposed axially extending paramagnetic leads:
a bin having a pair of parallel, spaced side walls for receiving a supply of diodes;
a feed wheel mounted with a sector extending between the side walls of said bin, said wheel having diode receiving slots and indexing slots formed about the periphery thereof, with each of said index slots aligned with one of said diode receiving slots;
means on said feed wheel for attracting and holding diodes in each of said diode receiving slots;
means for magnetically supporting and urging the supply of diodes to migrate from one end of the bin to an opposite end of said bin and toward the sector of the wheel projecting into the bin, to seat diodes in slots in the sector;
means for rotating the wheel in a first direction into and through said opposite end of said bin to pick up diodes in the diode receiving slots;
a test device mounted for rotation with said feed wheel and having;
a pawl pivotally mounted on said test device for engaging one of said index slots;
test probes for engaging the leads of a diode positioned in an article receiving slot adjacent said one of said index slots;
means for biasing said test device in a second direction and for urging said pawl to seat within an index slot;
means positioned for engaging the test device to permit said biasing means to move said test device a predetermined distance in said second direction as said feed wheel is further moved in said first direction and to move pivotally said pawl out of said index slot; and
means positioned the predetermined distance for anesting said test device to permit said biasing means to seat said pawl in the next successive index slot.

18. In an apparatus for transferring and testing diodes having opposed axially extending paramagnetic leads:
a bin having a pair of parallel, spaced side walls for receiving a supply of diodes;
a feed wheel mounted with a sector extending between the side walls of the bin and having diode receiving slots formed about the periphery thereof with index slots on each side of the diode slots, each of said index slots on one side of said wheel aligned with one of said diode receiving slots, and index slots on the other side of said wheel aligned with alternate ones of said diode receiving slots;
means on said wheel for attracting and holding diodes in each of said diode receiving slots;
means for magnetically supporting and urging the supply of diodes to migrate from end of the bin to an opposite end of the bin and toward the sector of the wheel projecting into the bin to seat diodes in slots in the sector;
means for rotating the wheel in a first direction into and through said opposite end of said bin to pick up diodes in the diode receiving slots;
a first test device mounted for rotation with said feed wheel for testing diodes in diode receiving slots aligned with index slots on said one side of said wheel and having;
a pawl pivotally mounted thereon to engage successive ones of said index slots one side of the wheel;
test probes for engaging the leads of diode positioned in a receiving slot aligned with one of said index slots;
a second test device identical to said first test device for testing successive alternate ones of said diodes in receiving slots aligned with said index slots in the other side of said wheel, said second device having a pawl pivotally mounted to engage successive ones of said index slots on the other side of the wheel;
means for biasing said test devices in a second direction and for urging said pawls to seat within said index slots;

means positioned at one end of a predetermined distance for engaging each of said test devices to permit said biasing means to move said test device a predetermined distance in said second direction as said feed wheel is further moved in said first direction, and move pivotally said pawl out of said index slot; and means positioned at the other end of the predetermined distance for arresting said test devices to permit said biasing means to seat each of said pawls in the next successive index slot, said first and second test devices arranged to operate so that one of said test devices is moved with said feed wheel in said first direction to test a leading diode while the other of said test devices is returned in a second direction to engage the next successive alternate diode.